(12) United States Patent
Yang et al.

(10) Patent No.: US 8,359,559 B2
(45) Date of Patent: Jan. 22, 2013

(54) METHODS AND SYSTEMS FOR EVALUATING CHECKER QUALITY OF A VERIFICATION ENVIRONMENT

(75) Inventors: Kai Yang, San Jose, CA (US); Michael Lyons, Voreppe (FR); Kuo-Ching Lin, Taichung (TW); Wei-Ting Tu, Hsinchu (TW); Chih-Wen Chang, Sanchong (TW); Tein-Chun Wei, Banqiao (TW)

(73) Assignees: Springsoft Inc., Hsinchu (TW); Springsoft USA, Inc., San Jose, CA (US)

(*) Notice: Subject to any disclaimer, the term of this patent is extended or adjusted under 35 U.S.C. 154(b) by 78 days.

(21) Appl. No.: 12/977,376

(22) Filed: Dec. 23, 2010

(65) Prior Publication Data
US 2011/0302541 A1    Dec. 8, 2011

Related U.S. Application Data

(60) Provisional application No. 61/351,325, filed on Jun. 4, 2010.

(51) Int. Cl.
*G06F 17/50* (2006.01)
*G06F 9/455* (2006.01)
(52) U.S. Cl. ....................... 716/106; 716/111
(58) Field of Classification Search ............. 716/106, 716/111
See application file for complete search history.

(56) References Cited

U.S. PATENT DOCUMENTS
2007/0226663 A1* 9/2007 Bormann et al. ............. 716/5

OTHER PUBLICATIONS

SpringSoft USA, Inc.; "Certitude Functional Qualification System"; 2009; pp. 1-4.*

* cited by examiner

*Primary Examiner* — Suresh Memula
(74) *Attorney, Agent, or Firm* — McClure, Qualey & Rodack, LLP (57) ABSTRACT

Methods and systems for evaluating checker quality of a verification environment are provided. In some embodiments, an overall sensitivity for the verification environment and an individual sensitivity for a respective checker are calculated. The overall sensitivity is a probability that a plurality of problematic design behaviors, which are propagated to a checker system including at least one checker, can be detected by the verification environment. The individual sensitivity is a probability that a plurality of problematic design behaviors, which are propagated to at least one specific probe among a plurality of probes of a design, can be detected by the checker corresponding to the specific probe. The overall checker sensitivity numbers can show the robustness of the check system. The individual checker sensitivity can guide the user which individual checker or checkers to improve.

20 Claims, 9 Drawing Sheets

|    | P1 | P2 | P3 | P4 | P5 | P6 |
|----|----|----|----|----|----|----|
| B1 | X  |    | X  |    |    |    |
| B2 |    | O  |    |    | O  |    |
| B3 | X  |    | X  |    |    |    |
| B4 | X  |    |    | X  |    |    |
| B5 |    |    | X  |    |    |    |
| B6 | O  |    |    |    |    |    |
| B7 |    | X  |    |    |    |    |
| B8 | O  | O  |    |    | O  |    |
| B9 |    |    |    |    |    |    |
| B10| X  |    |    | X  | X  |    |

|    | B1 | B2 | B3 | B4 | B5 | B6 | B7 | B8 | B9 | B10 |
|----|----|----|----|----|----|----|----|----|----|-----|
| P1 | X  |    |    | X  |    |    |    | O  |    | X   |
| P2 |    | O  |    |    |    |    | X  | O  |    |     |
| P3 | X  |    | X  |    | X  |    |    |    |    |     |
| P4 |    |    |    | X  |    |    |    |    |    | X   |
| P5 |    | O  | X  |    |    | O  |    | O  |    | X   |
| P6 |    |    |    |    |    |    |    |    |    |     |

METHODS AND SYSTEMS FOR EVALUATING CHECKER QUALITY OF A VERIFICATION ENVIRONMENT

CROSS REFERENCE TO RELATED APPLICATIONS

This application claims the benefit of U.S. Provisional Application No. 61/351,325 filed Jun. 4, 2010, the entirety of which is incorporated by reference herein.

BACKGROUND OF THE INVENTION

1. Field of the Invention

The disclosure relates generally to a verification environment for designs, and, more particularly to methods and systems for evaluating checker quality of a verification environment.

2. Description of the Related Art

Due to the increasing design complexity, verification has become the major bottleneck in chip design industry. Various verification methodologies have been adopted to verify whether the design behaviors are correct. Among all those approaches, dynamic verification (i.e. simulation) is still one of the major forces to drive the verification progress. A typical chip design is usually implemented in hardware-description-language (HDL) such as Verilog or VHDL. At the same time, a reference model, which is constructed in a much higher level of abstraction such as in C or C++, is developed for verification purposes. The idea behind dynamic verification is to apply various test stimuli on both the design and the reference model and compare the simulation results. The verification environment (VE) will assert if there is any difference in the simulation results between the design and the reference model.

There are many possible stimuli and configurations which can be simulated during the verification process. One of the key challenges is to generate as many stimuli to cover as many design corners as possible. To achieve this, current industry utilizes random test generation (RTG) to produce widely distributed test stimuli. Once the tests are generated, the second key challenge is to measure the simulation progress and determine if the design has been well verified. If not, more tests have to be generated and simulated. The process of determining whether a set of tests is enough is called the "closure decision". Current industry adopts various verification coverage metrics to measure the simulation progress and, based on that, make the closure decision.

Typical coverage metrics are code coverage and functional coverage. The idea is to measure the stimulus "distributions" under different criteria. For example, line-coverage (one type of code coverage) measures which sections of the implementation code are not executed under the applied stimulus. Similarly, the functional coverage measures the occurrence of values inside the implementation. Having a well distributed stimulus could imply that most of the design functions are executed. However, coverage results itself cannot decide if a simulated behavior is correct or not. It usually assumes any abnormal behavior will be captured by the verification environment. However, this assumption is not usually true. The checking mechanism (i.e. checkers) in the verification environment is just like any other source code, which is error-prone. In reality, verification teams might not have a robust checker system, or miss-connect or disable the checkers by accident. In this case, any error propagated to that checker will be missed. Without a dedicated tool to analyze the checker quality, the verification environment could be non-robust in many cases. For example, a verification environment which has a set of stimulus achieving 100% code/functional coverage could not verify anything without a good checker connected to it.

The checker is designed specifically to check the correctness of design behaviors under various stimuli and conditions. There are many mechanisms to implement checkers such as: shell diff, scripting language such as Perl, assertion, waveform diff, signatures, scoreboards, monitors, and others. In reality, each checker only covers certain regions of design functions. Therefore, each checker has different levels of effectiveness for capturing exception behaviors. It is really critical to quantify the checker quality if we would like to know the quality of the whole verification environment. If a checker is not robust, the verification team should fix it to ensure the effectiveness of the verification environment.

As described, the quality of the test stimulus and the checker should both be considered in the verification closure decision. The stimulus quality, which is usually modeled as coverage, has been well addressed. However, the lack of dedicated checker-related metric and tools is the missing piece in current verification environment.

Conventionally, a mutation-testing method injects artificial faults into a given design (HDL) and runs simulation on the fault-injected-design with a given set of test stimulus to see if the injected faults can be detected by the verification environment. If a fault can be propagated to the circuit boundary but can never be detected by the verification environment, this implies that there are missing checkers to capture this particular fault behavior. This kind of fault, which is activated, propagated to the output, but not detected, is classified as a non-detected (ND) fault in the mutation-testing method. Running various kinds of artificial faults and analyzing the reported ND faults could reveal the checker issues.

However, there are several missing pieces in the mutation-based technique if verifiers would like to adopt it to address the checker problems more systematically. First, there is a lack of metrics to perform systematic measurement of checker quality. The ND faults in the mutation-testing method do point out checker weakness. However, it is not intuitive to have a systematic quality measurement based on that. Secondly, the run-time of mutation-testing could be very long. In order to classify a given fault as ND, the mutation-testing has to simulate all tests that activate this fault. This might take a long time as there could be many tests that activate a particular fault. Before any ND fault is reported by the mutation-testing engine, there is no information pertaining to checker weakness. Thirdly, there is no flexible support of historical data merge and aggregation. As the nature of the mutation-testing method is such that the fault is injected inside a design, if the design or the verification environment evolves during the design cycles (ex: new HDL code, new version of design), the historical data, which were generated based on the previous version of design, could be totally invalid. For example, the simulated fault could disappear after the HDL changes. Even the fault itself is not changed; the corresponding behavior could be very different due to the potential functional changes in the surrounding circuit. Taking the historical data into account is one of the key features for any kind of verification metric. This is especially true as the run-time of mutation-testing is really costly and any invalid data would be just a waste of time and resources. Without the capability of aggregating historical data, designers cannot monitor the progress of improvement of their verification environment.

For those reasons, directly utilizing mutation-testing method to identify problematic checkers might not be an optimal approach. The absence of metric and historical data management will not make it a proper verification metric.

BRIEF SUMMARY OF THE INVENTION

Methods and systems for evaluating checker quality of a verification environment are provided.

In an embodiment of a method for evaluating checker quality of a verification environment, an overall sensitivity for the verification environment is calculated. The overall sensitivity is a probability that a plurality of problematic design behaviors, which are propagated to a checker system comprising at least one checker, can be detected by the verification environment.

In some embodiments, the calculation of the overall sensitivity is performed by dividing the number of the problematic design behaviors, which are propagated and detected by the checker system, by the number of the problematic design behaviors which are propagated to the checker system.

In some embodiments, a design is simulated using a stimulus, and first design behaviors for the respective probe of the design are recorded. At least one fault is injected into the design. The design with the fault is simulated using the stimulus, and second design behaviors for the respective probe of the design are recorded. During the simulation of the design with the fault, part or all of the problematic design behaviors are detected and reported by the verification environment, and the number of the detected problematic design behaviors is recorded. The number of the problematic design behaviors, which are propagated to the checker system is obtained by comparing the first design behaviors and the second design behaviors.

In some embodiments, a design is simulated using a stimulus, and first design behaviors for the respective probe of the design are recorded. The first design behaviors are modified, and input to the checker system of the verification environment. Part or all of the problematic design behaviors caused by the modified first design behaviors are detected and reported by the verification environment, and the number of the detected problematic design behaviors is recorded The number of the problematic design behaviors, which are propagated to the checker system is obtained based on the modified first design behaviors.

In an embodiment of a method for evaluating checker quality of a verification environment, an individual sensitivity for a respective checker of a checker system is calculated. The individual sensitivity is a probability that a plurality of problematic design behaviors, which are propagated to at least one specific probe among a plurality of probes of a design, can be detected by the checker corresponding to the specific probe.

In some embodiments, the individual sensitivity comprises an optimistic sensitivity for the respective checker, and the calculation of the optimistic sensitivity is performed by dividing the number of the problematic design behaviors, which are propagated to the specific probe corresponding to the respective checker and detected by the checker, by the number of the problematic design behaviors, which are propagated to the specific probe corresponding to the respective checker.

In some embodiments, the individual sensitivity comprises a pessimistic sensitivity for the respective checker, and the calculation of the pessimistic sensitivity is performed by dividing a number of the problematic design behaviors, which are only propagated to the specific probe corresponding to the respective checker and detected by the checker, by a number of the problematic design behaviors, which are propagated to the specific probe corresponding to the respective checker.

An embodiment of a system for evaluating checker quality of a verification environment comprises a storage unit and a processing unit. The storage unit comprises a checker system comprising at least one checker of the verification environment. The processing unit executes the checker system, and calculates an overall sensitivity for the verification environment or calculates an individual sensitivity for the respective checker of the checker system. The overall sensitivity is a probability that a plurality of problematic design behaviors, which are propagated to a checker system comprising at least one checker, can be detected by the verification environment. The individual sensitivity is a probability that a plurality of problematic design behaviors, which are propagated to at least one specific probe among a plurality of probes of a design, can be detected by the checker corresponding to the specific probe.

Methods and systems for evaluating checker quality of a verification environment may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for evaluating checker quality of a verification environment are provided.

Figure 9:
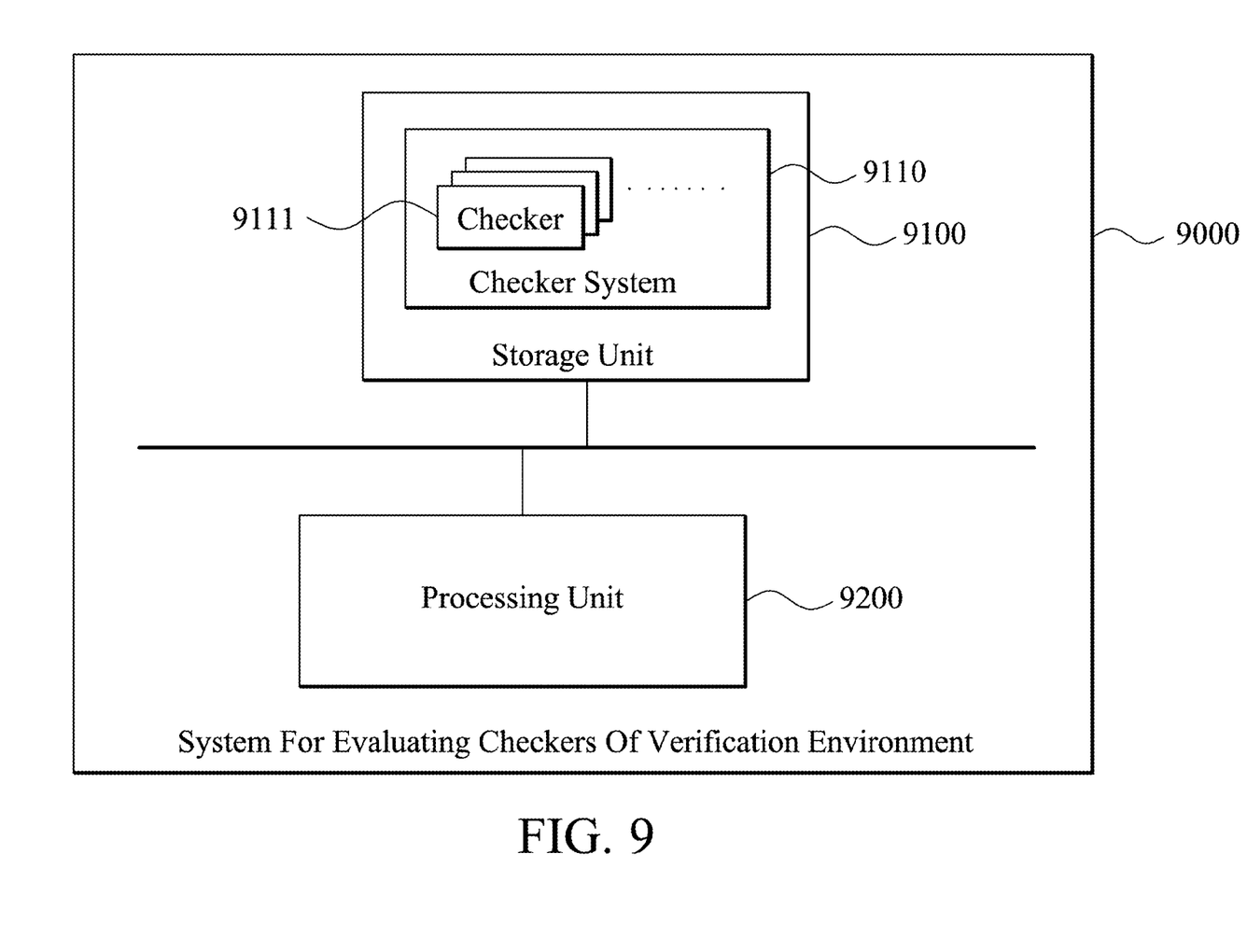
FIG. 9 is a schematic diagram illustrating an embodiment of a system for evaluating checker quality of a verification environment of the invention.

FIG. 9 is a schematic diagram illustrating an embodiment of a system for evaluating checker quality of a verification environment of the invention. The system for evaluating checker quality of a verification environment 9000 can be implemented in an electronic device, such as a computer system.

The system for evaluating checker quality of a verification environment 9000 comprises a storage unit 9100 and a processing unit 9200. The storage unit 9100 comprises a checker system 9110 comprising a plurality of checkers 9111 of a verification environment. The verification environment can be used to verify designs, such as chip designs. The processing unit 9200 can execute the checker system 9110, and perform the method for evaluating checker quality of a verification environment of the invention, which will be discussed further in the following paragraphs. Further, the system for evaluating checker quality of a verification environment 9000 may further comprise a display unit (not shown in FIG. 9) for displaying related interfaces and/or data generated by the processing unit 9200.

Figure 1:
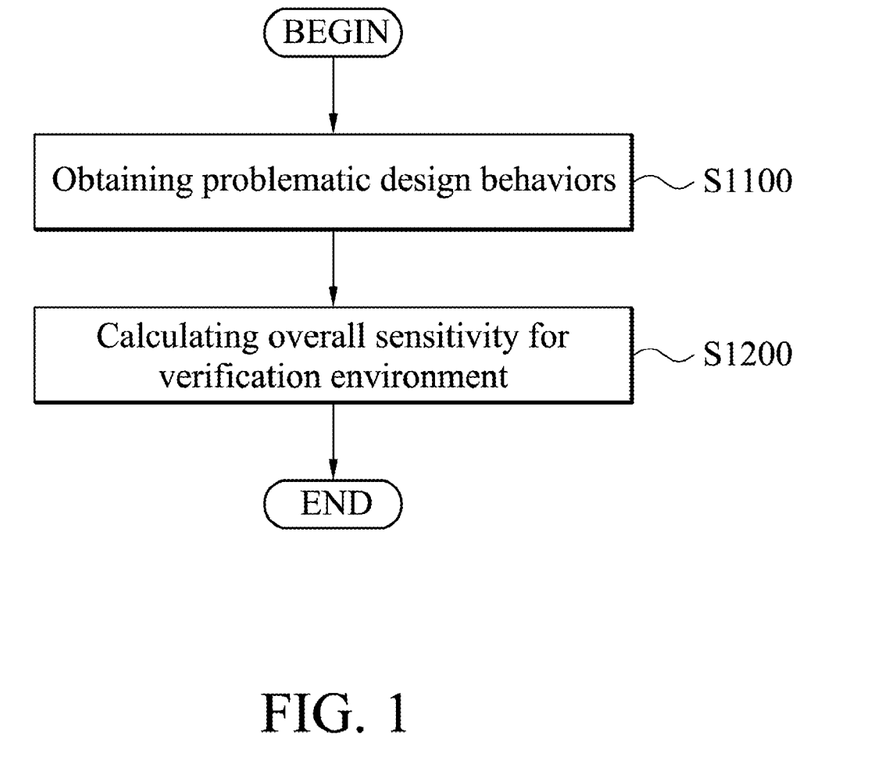
FIG. 1 is a flowchart of an embodiment of a method for evaluating checker quality of a verification environment of the invention.

FIG. 1 is a flowchart of an embodiment of a method for evaluating checker quality of a verification environment of the invention. The method for evaluating checker quality of a verification environment can be implemented in an electronic device, such as a computer system with the verification environment comprising a plurality of checkers, wherein the verification environment can be used to verify designs, such as chip designs.

In step S1100, problematic design behaviors are obtained. It is noted that, several ways can be used to obtain the problematic design behaviors, and the problematic design behaviors can be propagated to the checker system via a plurality of probes, wherein the probes may be ports of a chip boundary of the design.

Figure 2:
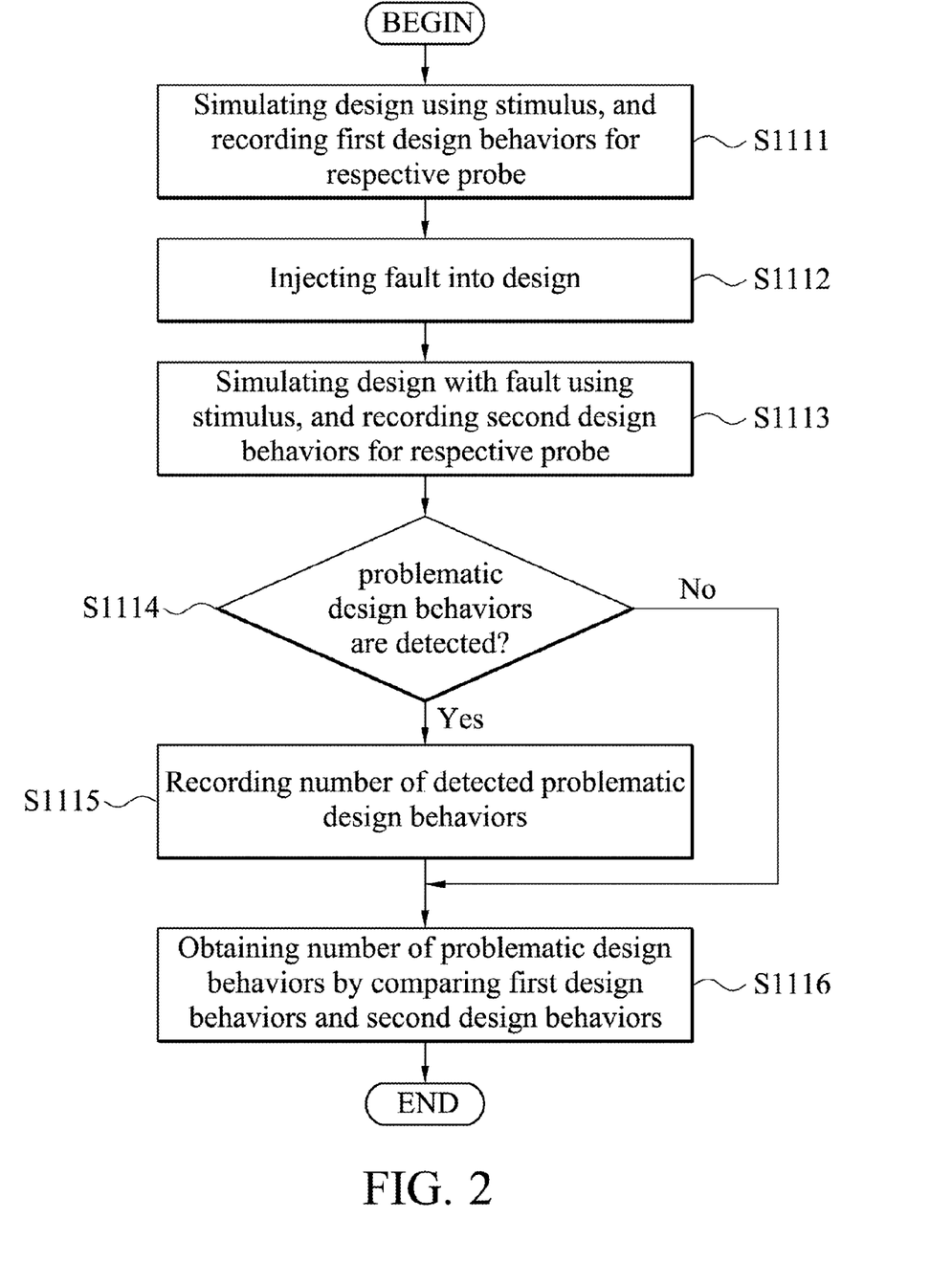
FIG. 2 is a flowchart of an embodiment of a method for obtaining problematic design behaviors of the invention.

FIG. 2 is a flowchart of an embodiment of a method for obtaining problematic design behaviors of the invention. In step S1111, a design is simulated using a stimulus, and during the simulation of the design, first design behaviors for the respective probe of the design are recorded into a database of a storage unit. It is understood that, in some embodiments, the design behaviors may be waveforms.

In step S1112, at least one fault is injected into the design. In step S1113, the design with the fault is simulated using the stimulus, and during the simulation of the design with the fault, second design behaviors for the respective probe of the design are recorded into the database of the storage unit. It is understood that, during the simulation of the design with the fault, the checker system of the verification environment will report whether a problematic design behavior is detected. If any problematic design behavior is detected (Yes in step S1114), in step S1115, the problematic design behaviors detected and reported by the verification environment, and the total number of problematic design behaviors being detected, which is denoted as "#Det" are also recorded. If no problematic design behavior is detected (No in step S1114), in step S1116, the number of the problematic design behaviors, which are propagated to any probe of the checker system is calculated by comparing the first design behaviors and the second design behaviors. It is noted that, the total number of problematic design behaviors, which are propagated to any probe is denoted as "#Prop".

Figure 3:
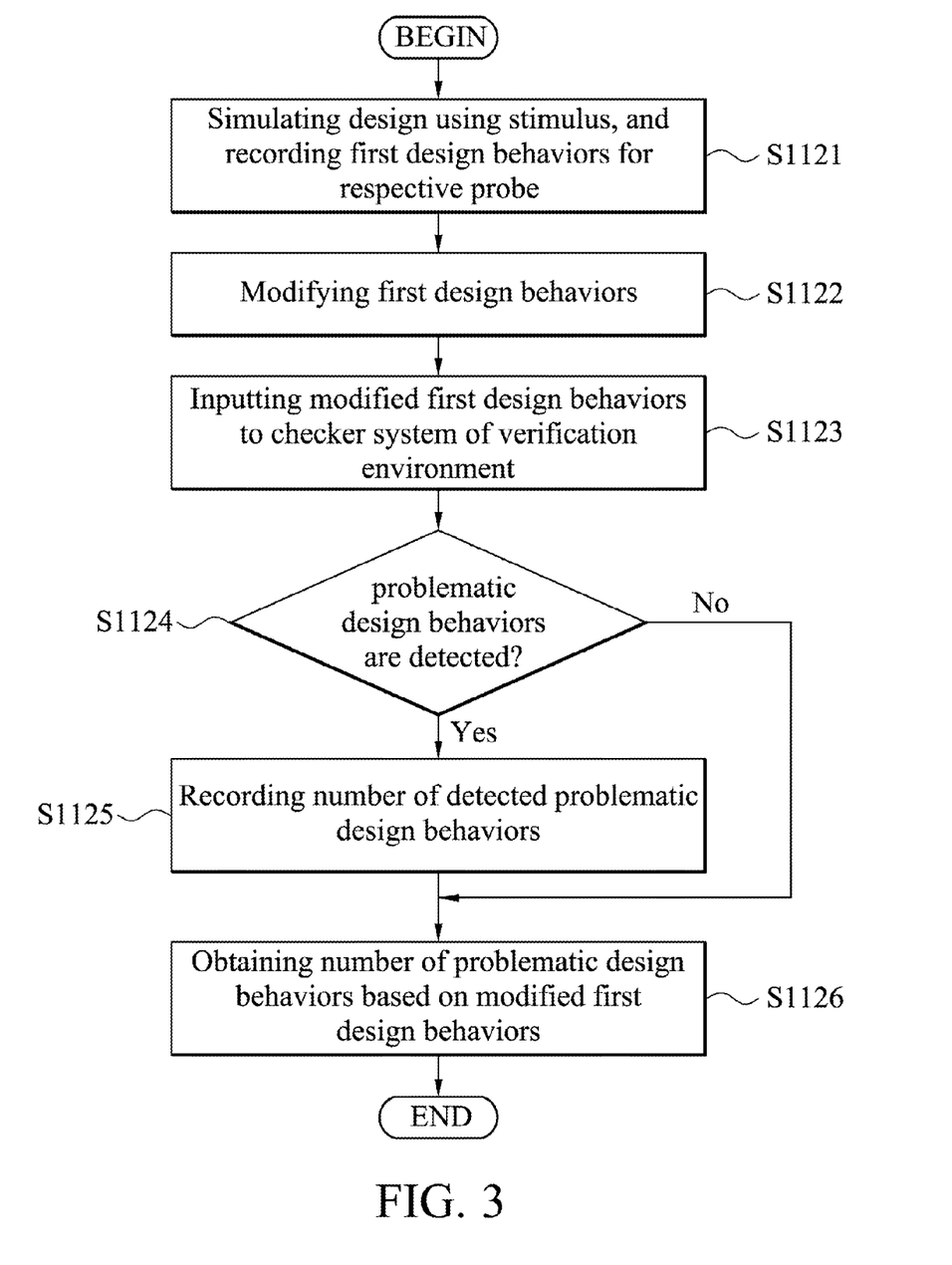
FIG. 3 is a flowchart of another embodiment of a method for obtaining problematic design behaviors of the invention.

FIG. 3 is a flowchart of another embodiment of a method for obtaining problematic design behaviors of the invention. In step S1121, a design is simulated using a stimulus, and during the simulation of the design, first design behaviors for the respective probe of the design are recorded into a database of a storage unit. Similarly, in some embodiments, the design behaviors may be waveforms. In step S1122, the first design behaviors are modified. In step S1123, the original design is removed from the verification environment, and the first design behaviors are replaced with the modified first design behaviors, and the modified first design behaviors are directly input to the checker system of the verification environment. Similarly, during the simulation of the design with the fault, the checker system of the verification environment will report whether a problematic design behavior is detected. If any problematic design behavior is detected (Yes in step S1124), in step S1125, the problematic design behaviors detected and reported by the verification environment, and the total number of problematic design behaviors being detected, which is denoted as "#Det" are also recorded. If no problematic design behavior is detected (No in step S1124), in step S1126, the number of the problematic design behaviors, which are propagated to any probe of the checker system can be directly known and obtained based on the modified first design behaviors. It is understood that, the number of the problematic design behaviors will be known right away based on the modification in step S1122. Similarly, the total number of problematic design behaviors, which are propagated to any probe is denoted as "#Prop".

In step S1200, an overall sensitivity for the verification environment is calculated. It is noted that, the overall sensitivity is a probability that the problematic design behaviors, which are propagated to the checker system, can be detected by the verification environment. In some embodiments, the calculation of the overall sensitivity is performed by dividing the number of the problematic design behaviors which are propagated and detected by the checker system, by the number of the problematic design behaviors which are propagated to the checker system. For example, the overall sensitivity for the verification environment can be derived as "#Det/#Prop". It is noted that, in some embodiments, in addition to the probability, the numbers, #Det and #Prop, can be also provided or displayed via a user interface. It is understood that, the numbers, #Det and #Prop, are also important, and may be provided to users. For example, although 3/10 vs. 300/1000 both yield 30% probability, however, they mean two different things to the user, wherein the former tells the user that the number of propagated problematic behaviors is low, and therefore more tests may be needed; the latter indicates that the number of propagated problematic behaviors is probably good enough, but the checker is too weak to catch the differences.

Figure 4:
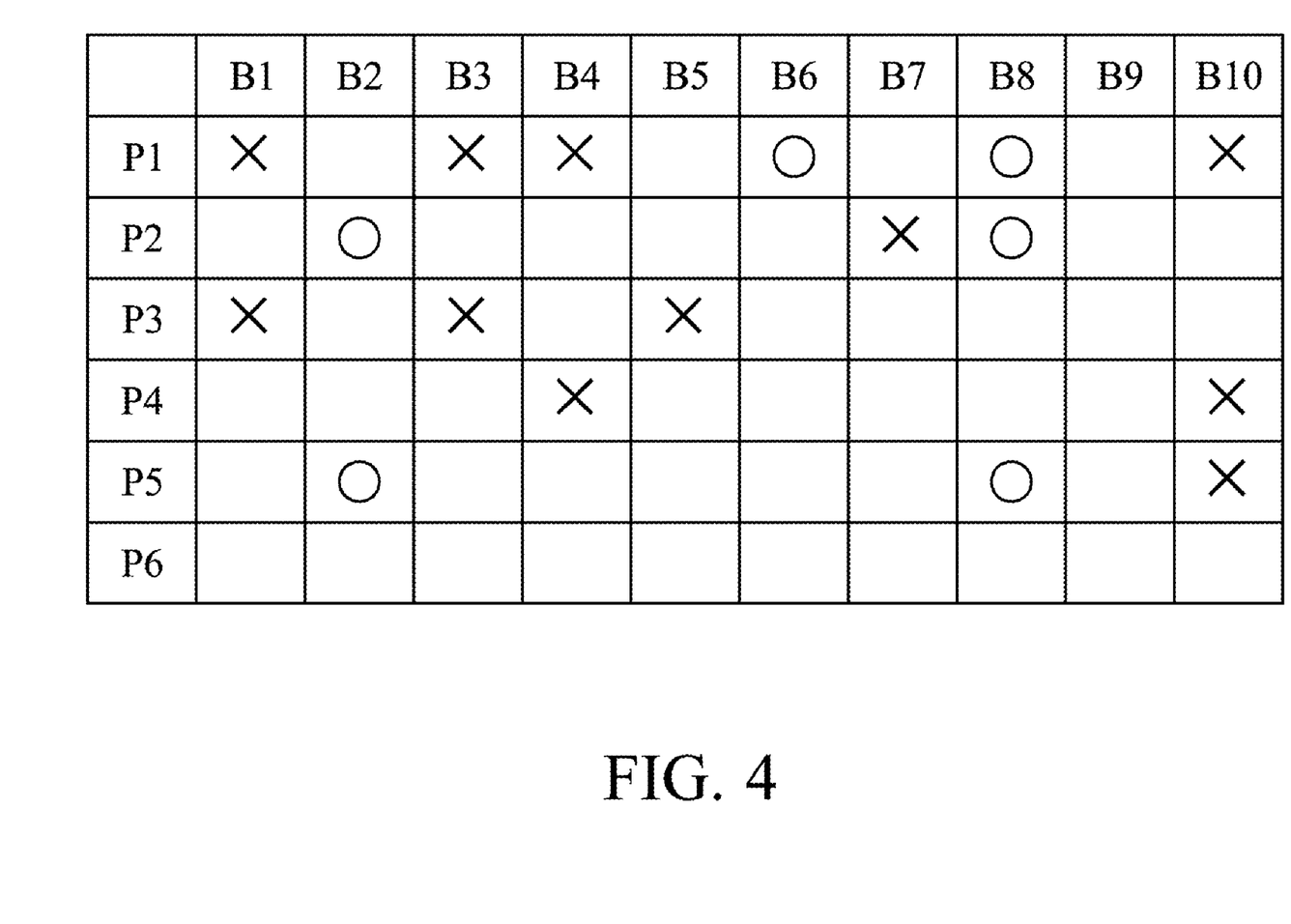
FIG. 4 is a schematic diagram illustrating an example of a probe-status-matrix of the invention.

It is understood that, in some embodiments, the problematic design behaviors, the problematic design behaviors which are propagated to the probes of the design, and the problematic design behaviors which are propagated to the probes of the design and detected by the verification environment can be used to generate a probe-status-matrix. FIG. 4 is a schematic diagram illustrating an example of a probe-status-matrix of the invention. In FIG. 4, a cell without any mark represents a fault which is activated by a specific stimulus but not propagated to a specific probe. A cell with a cross represents a fault which is activated by a specific stimulus and propagated to a specific probe but not detected by the verification environment. A cell with a circle represents a fault which is activated by a specific stimulus propagated to a specific probe and detected by the verification environment. In this example, the overall sensitivity for the verification environment is 3/9. It is understood that, in some embodiments, unique design behaviors can be taken into account. That is, when a set of identical problematic design behaviors are propagated to the checker, only one of the problematic design behaviors is used to calculate the overall sensitivity. For example, in FIG. 4, the problematic design behaviors B1 and B3 are the same, and only one of them is used to calculate the overall sensitivity, and the overall sensitivity for the verification environment is 3/8.

It is understood that, in some embodiments, a signature for the respective problematic design behaviors, which are propagated to the checker system can be calculated and stored. For example, CRC can be performed on value-change and value-change-time for each problematic design behavior, and the signatures for each problematic design behavior can be combined and stored in a hash/set. When a new problematic design behavior among all probes is generated, the uniqueness of the new problematic design behavior is accordingly checked.

Figure 5:
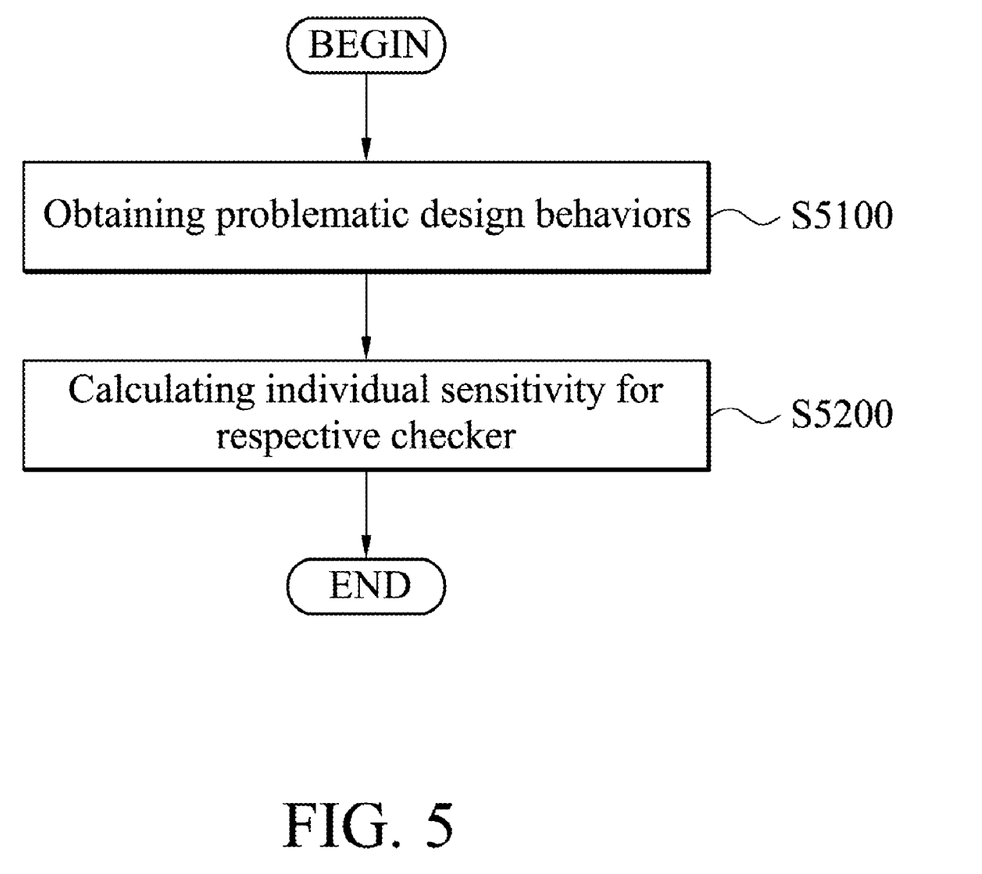
FIG. 5 is a flowchart of an embodiment of a method for evaluating individual checkers of a verification environment of the invention.

FIG. 5 is a flowchart of an embodiment of a method for evaluating individual checkers of a verification environment of the invention. The method for evaluating checker quality of a verification environment can be used in an electronic device with the verification environment comprising a plurality of checkers, wherein the verification environment can be used to verify designs, such as chip designs.

In step S5100, problematic design behaviors are obtained. Similarly, several methods, such as the embodiments in FIGS. 2 and 3 can be used to obtain the problematic design behaviors. In step S5200, an individual sensitivity is calculated for the respective checker of the checker system. It is noted that, the individual sensitivity is a probability that the problematic design behaviors, which are propagated to at least one specific probe among a plurality of probes of a design, can be detected by the checker corresponding to the specific probe. It is understood that, each checker can be connected to at least one probe. It is noted that, in some embodiments, the individual sensitivities for respective checkers may comprise an optimistic sensitivity and a pessimistic sensitivity. The optimistic sensitivity is based on an assumption that any detection is detected by all of the propagated probes, and represents an upper-bound probability of a propagated error that can be detected by this probe. The pessimistic sensitivity is based on an assumption that a reported detection is detected by the probe, and only the probe is propagated with the error, and represents a lower-bound probability of a propagated error which can be detected by this probe.

Figure 6:
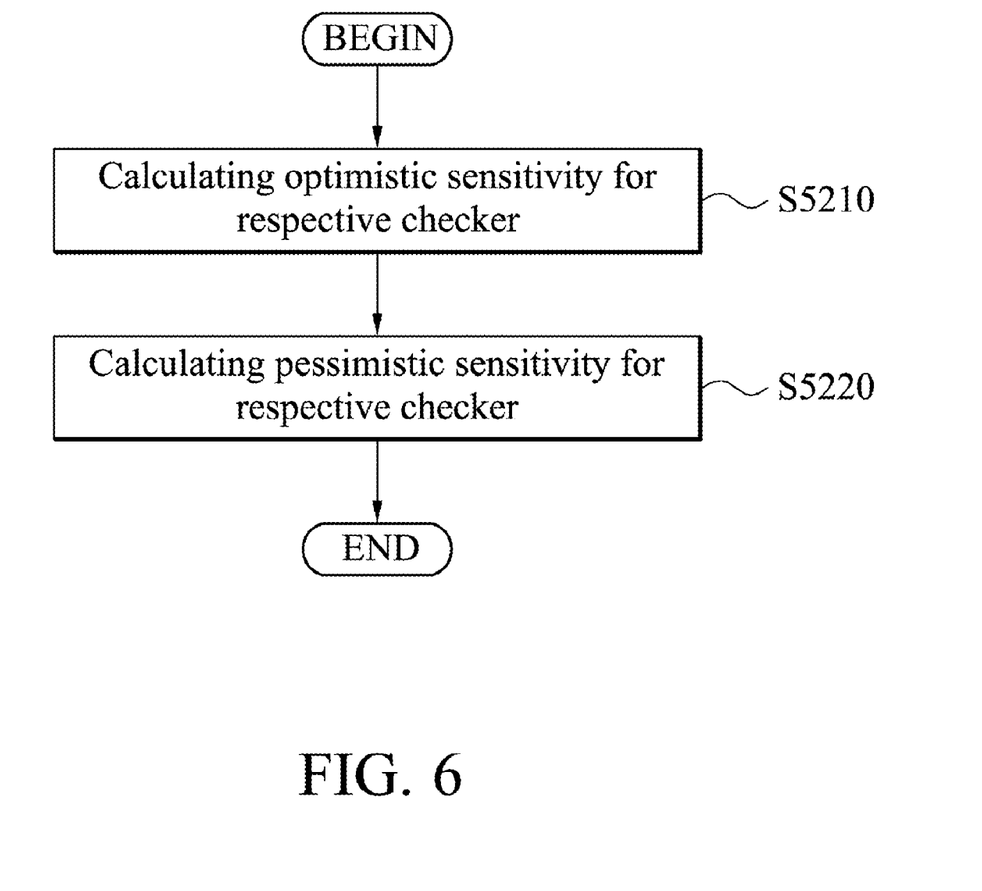
FIG. 6 is a flowchart of an embodiment of a method for calculating an individual sensitivity for respective checker of the invention.

FIG. 6 is a flowchart of an embodiment of a method for calculating an individual sensitivity for respective checkers of the invention. In step S5210, the optimistic sensitivity for respective checkers is calculated by dividing the number of the problematic design behaviors which are propagated to the specific probe corresponding to the respective checker and detected by the checker, by the number of the problematic design behaviors which are propagated to the specific probe corresponding to the respective checker. In step S5220, the pessimistic sensitivity for respective checker is calculated by dividing the number of the problematic design behaviors which are only propagated to the specific probe corresponding to the respective checker and detected by the checker, by the number of the problematic design behaviors which are propagated to the specific probe corresponding to the respective checker. It is understood that, the number of the problematic design behaviors which are propagated to the specific probe corresponding to the respective checker and detected by the checker, the number of the problematic design behaviors which are only propagated to the specific probe corresponding to the respective checker and detected by the checker, and the number of the problematic design behaviors which are propagated to the specific probe corresponding to the respective checker can be obtained during step S5100.

Figure 7:
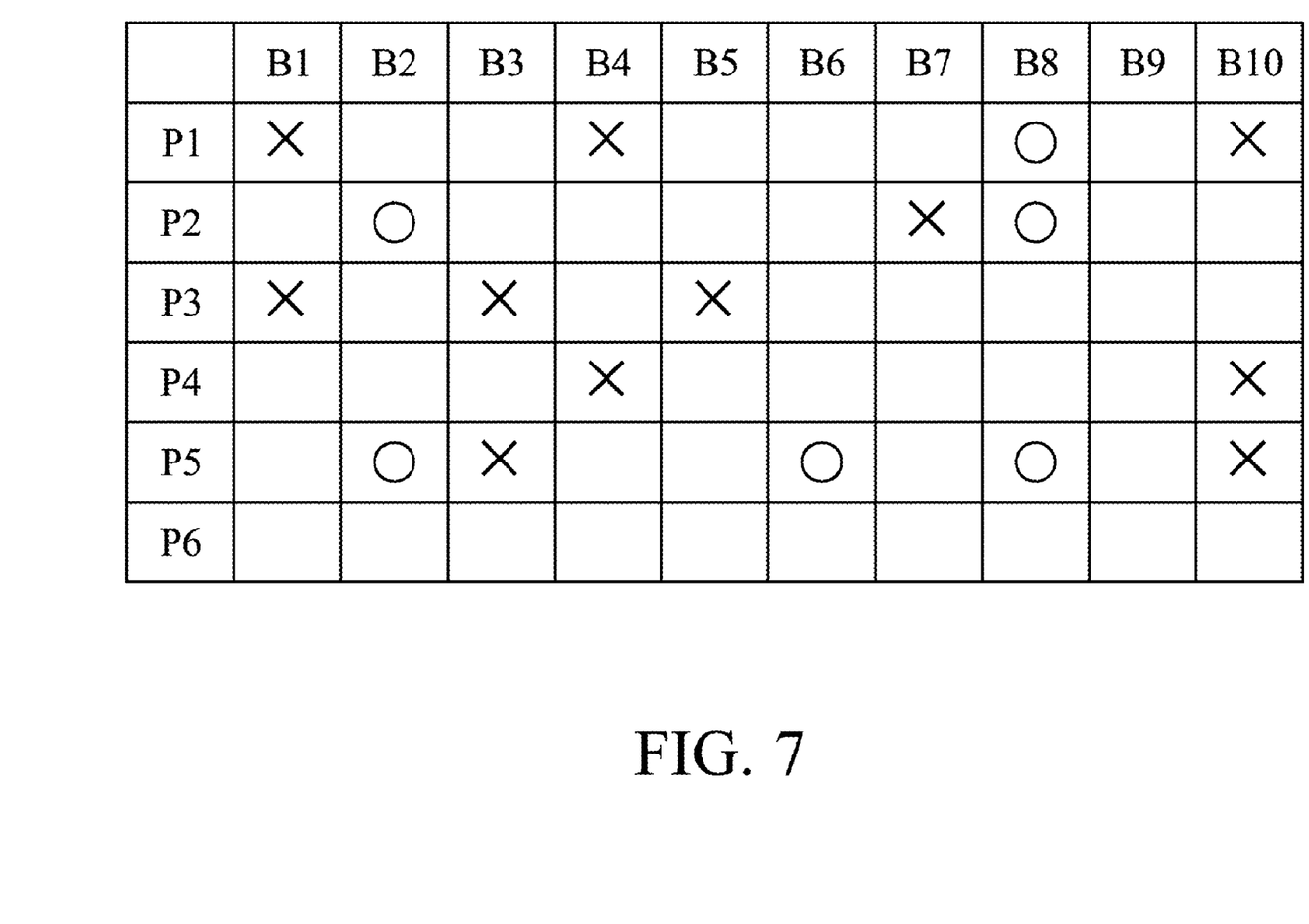
FIG. 7 is a schematic diagram illustrating another example of a probe-status-matrix of the invention.

FIG. 7 is a schematic diagram illustrating another example of a probe status matrix of the invention. In this example, the optimistic sensitivity for probe P1 is 1/4, and the pessimistic sensitivity for probe P1 is 0/4. The optimistic sensitivity for probe P5 is 3/5, and the pessimistic sensitivity for probe P5 is 1/5 since problematic design behavior B6 is only propagated to probe P5.

Similarly, in some embodiments, a signature for the respective problematic design behaviors for calculating individual checker sensitivity which are propagated to the checker system can be stored in a hash/set. When a new problematic design behavior among all probes is generated, the uniqueness of the new problematic design behavior is checked.

Figure 8:
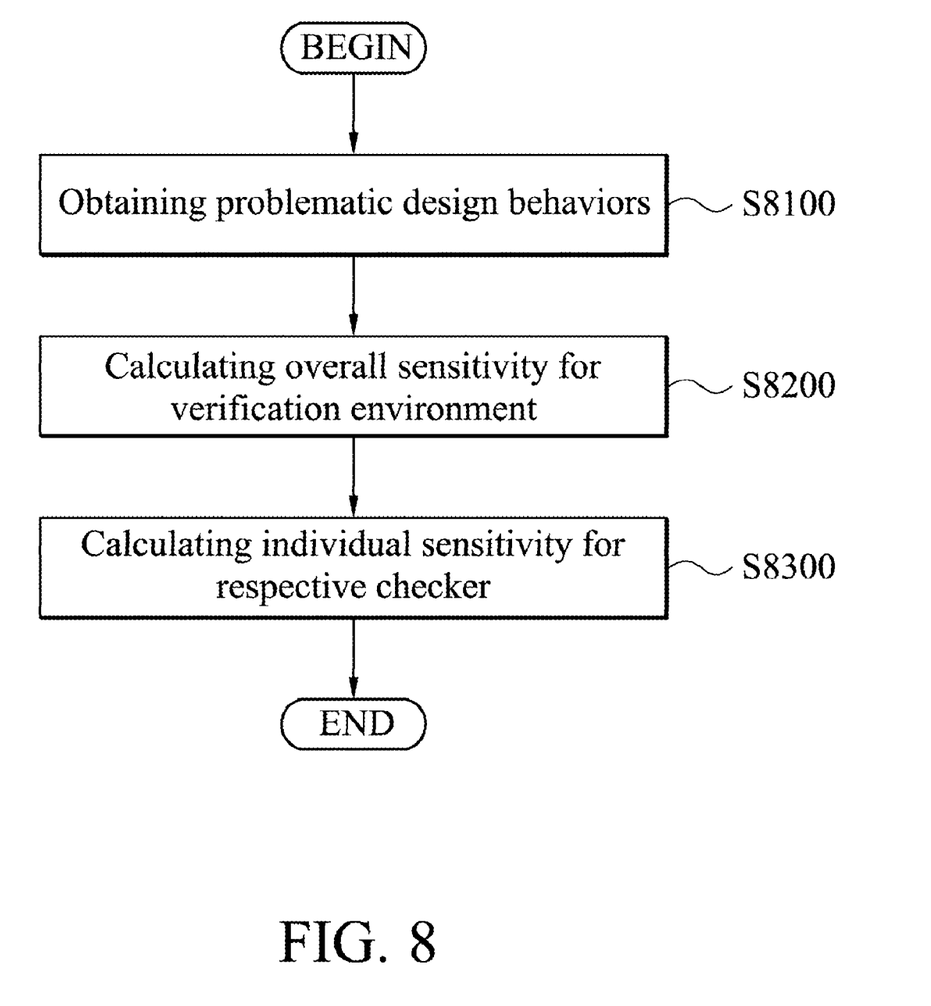
FIG. 8 is a flowchart of an embodiment of a method for evaluating overall and individual checkers of a verification environment of the invention.

FIG. 8 is a flowchart of another embodiment of a method for evaluating checker quality of a verification environment of the invention. The method for evaluating checker quality of a verification environment can be used in an electronic device with the verification environment comprising a plurality of checkers, wherein the verification environment can be used to verify designs, such as chip designs.

In step S8100, problematic design behaviors are obtained. Similarly, several methods, such as the embodiments in FIGS. 2 and 3 can be used to obtain the problematic design behaviors. In step S8200, an overall sensitivity for the verification environment is calculated. The overall sensitivity is a probability that the problematic design behaviors which are propagated to the checker system can be detected by the verification environment. In some embodiments, the calculation of the overall sensitivity is performed by dividing the number of the problematic design behaviors which are propagated and detected by the checker system, by the number of the problematic design behaviors propagated to the checker system. In step S8300, an individual sensitivity is calculated for the respective checker of the checker system. The individual sensitivity is a probability that the problematic design behaviors which are propagated to at least one specific probe among a plurality of probes of a design can be detected by the checker corresponding to the specific probe. Similarly, in some embodiments, the individual sensitivity for respective checkers may comprise an optimistic sensitivity and a pessimistic sensitivity. The optimistic sensitivity for respective checker is calculated by dividing the number of the problematic design behaviors which are propagated to the specific probe corresponding to the respective checker and detected by the checker, by the number of the problematic design behaviors which are propagated to the specific probe corresponding to the respective checker. The pessimistic sensitivity for respective checker is calculated by dividing the number of the problematic design behaviors which are only propagated to the specific probe corresponding to the respective checker and detected by the checker, by the number of the problematic design behaviors which are propagated to the specific probe corresponding to the respective checker.

It is noted that, the proposed overall sensitivity and the individual sensitivities will enable the verification team to qualify their checker quality in their verification environment. Furthermore, the proposed evaluation methods will also serve as a guidance for checker enhancement. It can point out which checkers need more attention for enhancement or refinement. For example, the numbers of the overall sensitivity of the checker system can show the robustness of the check system, and the individual sensitivity can guide the user which individual checker or checkers to improve.

Further, the proposed evaluation methods provide a flexible way to incrementally collect the required data during qualification process which is independent of the design change or test update. It also provides the capability to on-the-fly update the metric resulting from any checker configuration change or checker capability improvement. In the verification process, design change usually refers to a new version of source code and/or different peripheral logics that are applied. On the other hand, test update usually refers to adding test scenarios or removing existing test cases in the regression suite. If there is a design-change and/or test-update, the method for evaluating checker quality of a verification environment can be easily updated by incrementally accumulating the newly obtained data (detection and propagation information) into the existing database (probe-status-matrix). The overall sensitivity and individual sensitivity can be derived accordingly. The reason that the methods have this flexibility is because the data (problematic design behaviors), which is used to evaluate the sensitivity, is not relevant to the design-change and/or test-update. It does not matter whether or not the new design or test update can reproduce the problematic design behaviors. Further, during the process of sensitivity evaluation, users may change the probe/checker configurations or improve the checker capability. For example, users can group a set of probes together to represent a particular checker. In this case, the existing data of the individual probes can be united to generate new matrix and evaluate the sensitivity accordingly. Additionally, users can also improve the existing checker during the verification process. In this case, only the problematic design behavior which affects (propagates to) the modified probes/checkers should be run again. By having this capability, users can update the sensitivity on-the-fly and don't have to re-run all problematic design behaviors. Additionally, not all problematic design behaviors are real errors. A behavior which is different from the golden one could still be considered as correct due to the design margin. In this case, a feedback mechanism and related user interfaces can be provided for users to unmark the crosses in the matrix which they think are correct. The matrix is thus refined according to this update.

Therefore, the methods and systems for evaluating checker quality of a verification environment can provide a metric to evaluate an overall sensitivity for the whole checker system of the verification environment, and evaluate an individual sensitivity for the respective checker, thus enabling the verification team to qualify the checker quality in the verification environment.

Methods for evaluating checker quality of a verification environment, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed:

1. A checker quality evaluation method for a verification environment, comprising:
   calculating an overall sensitivity for the verification environment wherein the overall sensitivity is a probability that a plurality of problematic design behaviors, which are propagated to a checker system comprising at least one checker, can be detected by the verification environment.

2. The method of claim 1, wherein the problematic design behaviors comprise waveforms, and the problematic design behaviors are propagated to the checker system via a plurality of probes.

3. The method of claim 2, wherein the probes comprise ports of a chip boundary of the design.

4. The method of claim 2, wherein the calculation of the overall sensitivity is performed by dividing the number of problematic design behaviors which are propagated and detected by the checker system, by the number of problematic design behaviors which are propagated to the checker system.

5. The method of claim 4, further comprising:
   collecting a plurality of stimulus that can be applied to the design;
   for each stimulus, simulating the design using the stimulus, and recording first design behaviors via respective probes on the design;
   collecting a plurality of faults that can be injected to the design;
   for each fault, injecting the fault into the design, re-simulating the design with the fault using the stimulus, and recording second design behaviors via the respective probes on the design, wherein during the simulation of the design with the fault, record if problematic design behaviors are detected by the verification environment; and
   obtaining the number of problematic design behaviors which are propagated to the checker system by comparing the first design behaviors with the second design behaviors; and
   obtaining the number of problematic design behaviors which are propagated to the checker system and are detected by the checker system from the records that indicate if problematic design behaviors are detected.

6. The method of claim 4, further comprising:
   collecting a plurality of stimulus that can be applied to the design;
   for each stimulus, simulating the design using the stimulus, and recording first design behaviors via respective probes on the design;
   modifying the first design behaviors, and inputting the modified first design behaviors to the checker system of the verification environment, and recording if problematic design behaviors are detected by the verification environment; and
   obtaining the number of problematic design behaviors which are propagated to the checker system from the number of modified first design behaviors which are inputted to the checker system; and
   obtaining the number of problematic design behaviors which are propagated to the checker system and are detected by the checker system from the records that indicate if problematic design behaviors are detected.

7. The method of claim 2, further comprising calculating and storing a signature for the respective problematic design behaviors which are propagated to the checker system.

8. The method of claim 2, further comprising calculating an individual sensitivity for the respective checker of the checker system, wherein the individual sensitivity is a probability that problematic design behaviors which are propagated to one specific probe among a plurality of probes of a design can be detected by the checker corresponding to the specific probe.

9. The method of claim 8, wherein the individual sensitivity comprises an optimistic sensitivity for the respective checker, and the calculation of the optimistic sensitivity is performed by dividing the number of problematic design behaviors which are propagated to the specific probe corresponding to the respective checker and detected by the checker, by the number of problematic design behaviors which are propagated to the specific probe corresponding to the respective checker.

10. The method of claim 8, wherein the individual sensitivity comprises a pessimistic sensitivity for the respective checker, and the calculation of the pessimistic sensitivity is performed by dividing the number of problematic design behaviors which are only propagated to the specific probe corresponding to the respective checker and detected by the checker, by the number of problematic design behaviors which are propagated to the specific probe corresponding to the respective checker.

11. The method of claim 8, wherein when multiple copies of problematic design behaviors are identical, only one is used in calculating the overall sensitivity or the individual sensitivity.

12. The method of claim 1, further comprising providing to the user the number of problematic design behaviors which are propagated to the checker system and the number of problematic design behaviors which are propagated and detected by the checker system.

13. A checker quality evaluation method for a verification environment, comprising:
 calculating an individual sensitivity for a respective checker of a checker system, wherein the individual sensitivity is a probability that a plurality of problematic design behaviors which are propagated to one specific probe among a plurality of probes of a design, can be detected by the checker corresponding to the specific probe.

14. The method of claim 13, wherein the individual sensitivity comprises an optimistic sensitivity for the respective checker, and the calculation of the optimistic sensitivity is performed by dividing the number of problematic design behaviors which are propagated to the specific probe corresponding to the respective checker and detected by the checker, by the number of problematic design behaviors, which are propagated to the specific probe corresponding to the respective checker.

15. The method of claim 13, wherein the individual sensitivity comprises a pessimistic sensitivity for the respective checker, and the calculation of the pessimistic sensitivity is performed by dividing the number of problematic design behaviors which are only propagated to the specific probe corresponding to the respective checker and detected by the checker, by the number of the problematic design behaviors which are propagated to the specific probe corresponding to the respective checker.

16. The method of claim 13, wherein when multiple identical copies of problematic design behaviors are propagated to the same specific probe of the design, only one is used in calculating the individual sensitivity.

17. The method of claim 13, further comprising providing to the user the number of problematic design behaviors which are propagated to the specific probe corresponding to the respective checker, the number of problematic design behaviors which are propagated to the specific probe corresponding to the respective checker and detected by the checker, and the number of problematic design behaviors which are only propagated to the specific probe corresponding to the respective checker and detected by the checker.

18. A machine-readable storage medium comprising a computer program, which, when executed, causes a device to perform a checker quality evaluation method for a verification environment, wherein the method comprises:
 calculating an overall sensitivity for the verification environment, wherein the overall sensitivity is a probability that a plurality of problematic design behaviors, which are propagated to a checker system comprising at least one checker, can be detected by the verification environment.

19. A machine-readable storage medium comprising a computer program, which, when executed, causes a device to perform a checker quality evaluation method for a verification environment, wherein the method comprises:
 calculating an individual sensitivity for a respective checker of a checker system, wherein the individual sensitivity is a probability that a plurality of problematic design behaviors which are propagated to one specific probe among a plurality of probes of a design can be detected by the checker corresponding to the specific probe.

20. A checker quality evaluation system for a verification environment, comprising:
 a storage unit comprising a checker system comprising at least one checker of the verification environment; and
 a processing unit executing the checker system, and calculating an overall sensitivity for the verification environment or calculating an individual sensitivity for the respective checker of the checker system, wherein the overall sensitivity is a probability that a plurality of problematic design behaviors which are propagated to a checker system comprising at least one checker can be detected by the verification environment, and the individual sensitivity is a probability that a plurality of problematic design behaviors which are propagated to one specific probe among a plurality of probes of the design can be detected by the checker corresponding to the specific probe.

* * * * *